United States Patent
Yoon et al.

(10) Patent No.: US 7,536,180 B2
(45) Date of Patent: May 19, 2009

(54) PUSH TO TALK (PTT) SERVICE METHOD

(75) Inventors: Sung-Jae Yoon, Gumi-si (KR);
Dong-Han Kang, Daegu (KR);
Jae-Gwan Shin, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 374 days.

(21) Appl. No.: 11/203,955

(22) Filed: Aug. 16, 2005

(65) Prior Publication Data
US 2006/0040689 A1 Feb. 23, 2006

(30) Foreign Application Priority Data
Aug. 18, 2004 (KR) .............................. 2004-65097

(51) Int. Cl.
*H04M 3/42* (2006.01)
*H04B 1/38* (2006.01)

(52) U.S. Cl. ..................................... 455/418; 455/414.1

(58) Field of Classification Search ................. 455/518, 455/519, 509, 515, 418, 419, 414.1, 516, 455/517, 520
See application file for complete search history.

(56) References Cited

U.S. PATENT DOCUMENTS

| | | | |
|---|---|---|---|
| 5,933,780 A * | 8/1999 | Connor et al. ............... | 455/519 |
| 6,516,200 B1 * | 2/2003 | Schmidt et al. ............. | 455/518 |
| 6,996,414 B2 * | 2/2006 | Vishwanathan et al. ..... | 455/518 |
| 7,398,079 B2 * | 7/2008 | Munje ..................... | 455/412.1 |
| 2003/0153339 A1 * | 8/2003 | Crockett et al. ............. | 455/518 |
| 2003/0153340 A1 * | 8/2003 | Crockett et al. ............. | 455/518 |
| 2003/0153341 A1 * | 8/2003 | Crockett et al. ............. | 455/519 |
| 2003/0153342 A1 * | 8/2003 | Crockett et al. ............. | 455/519 |
| 2005/0202806 A1 * | 9/2005 | Bourgeois et al. ........... | 455/416 |
| 2005/0239485 A1 * | 10/2005 | Kundu et al. ................ | 455/519 |
| 2007/0021131 A1 * | 1/2007 | Laumen et al. ............. | 455/518 |
| 2007/0155415 A1 * | 7/2007 | Sheehy et al. ............... | 455/518 |

FOREIGN PATENT DOCUMENTS

CN 1778130 5/2006

* cited by examiner

*Primary Examiner*—Blane J Jackson
(74) *Attorney, Agent, or Firm*—Roylance, Abrams, Berdo & Goodman, LLP

(57) ABSTRACT

A method of providing a Push-To-Talk (PTT) service is provided. In a PTT service provided through a PTT server to a PTT portable terminal, the PTT portable terminal requests termination of its participation in a PTT group call during the PTT group call takes place among at least three members, requests recording of the PTT group call to the PTT server, and ends a PTT application program. When the PTT group call is terminated among the remaining members, the PTT portable terminal receives from the PTT server a notification message indicating that the PTT group call has been recorded and plays the recorded PTT group call.

35 Claims, 7 Drawing Sheets

PUSH TO TALK (PTT) SERVICE METHOD

PRIORITY

This application claims the benefit under 35 U.S.C. § 119 (a) of an application filed in the Korean Intellectual Property Office on Aug. 18, 2004 and assigned Serial No. 2004-65097, the entire contents of which are hereby incorporated by reference.

BACKGROUND OF THE INVENTION

1. Field of the Invention

The present invention relates generally to wireless communications. In particular, the present invention relates to a Push-To-Talk (PTT) service method for allowing a PTT group call to be recorded for play back.

2. Description of the Related Art

Typically, a radio communication system comprising portable terminals divides a total service area into a plurality of smaller cell areas covered by base stations (BSs), and the BSs are under the centralized control of mobile switching centers (MSCs) to enable subscribers to call and maintain a call, while roaming across different cells.

Due to the development of communication technology, many techniques for integrating an Internet Protocol (IP) network with a wireless communication network have been developed. One such technique is Voice over IP (VoIP), a packet-based voice service using IP.

Traditionally, the VoIP service sets up a call via a mobile communication network and an IP network, which takes a long time. This shortcoming can be overcome by an interactive call service, such as a group call and a private call, relying on the multicast functionality of the IP network. An interactive call is a call made with user interactions. An example of the interactive call is a walkie-talkie type PTT call. A group call is a multi-user call which a plurality of PTT users initiate or participate in, simultaneously. A private call is a one-to-one call within a distinct group.

The PTT service enables simultaneous voice/data service for a plurality of users or in a group. A PTT user presses a PTT button to speak and the user's PTT-enabled portable terminal (hereinafter, referred to as a PTT portable terminal) transmits a PTT service request to a network. The network rejects the request or allocates required resources for the PTT call based on a predetermined criterion such as the availability of resources or the priority level of the user. At the same time, connections are established between the PTT user and all other active users within a predetermined subscriber group. After the voice connection is established, the PTT user can speak and the other users can hear on the channel. When the PTT user releases the PTT service, the PTT portable terminal transmits a release message to the network and the resources are released. This PTT communication system enables one-to-one and one-to-many or multi-party communications. The one-to-many communication is called a PTT group call in the PTT service.

A PTT call is initiated as a calling PTT portable terminal requests the PTT call to a receiving PTT portable terminal. The PTT call request is issued by pressing a PTT button. The receiving PTT portable terminal notifies the called party that the caller wants to talk to the called party on the PTT call (Talk Indication). The called party speaks with the caller during the PTT call.

With this conventional PTT service, however, a PTT user has no way of determining what was discussed at a PTT group call if the PTT user dropped the PTT group call during the call.

For example, if a PTT group call is made about a travel plan and one of the group members quits the call to turn to something urgent before the call ends, after the call has ended the user has no way of determining what was discussed during the user's absence.

Therefore, the user must call up other parties to ask what was discussed in the call during the user's absence. However, the user may not be provided with every detail of the conversation that took place among the group call members during the call.

SUMMARY OF THE INVENTION

An object of the present invention is to address at least the above described problems and/or disadvantages. Accordingly, an exemplary object of the present invention is to provide a Push To Talk (PTT) service method for recording a PTT group call and replaying the PTT group call record.

Another exemplary object of the present invention is to provide a PTT service method where, if a participant drops a PTT group call, a conversation that takes place among the other PTT participants during the participant's absence is recorded.

A further exemplary object of the present invention is to provide a PTT service method where a dropped participant is provided with a record of a conversation that takes place among the other PTT participants during the dropped participant's absence, after the call ends.

Still another exemplary object of the present invention is to provide a PTT service method where if a participant drops a PTT group call, the dropped participant is allowed to later resume participation in the on-going PTT group call via a PTT connection.

The above exemplary objects of the present invention are achieved by exemplary methods for providing a PTT service according to the present invention.

According to one exemplary aspect of the present invention, a PTT service is provided through a PTT server in a PTT portable terminal where if the PTT portable terminal requests termination of a PTT group call during the PTT group taking place between at least three members, requests PTT server to commence recording of the PTT group call, and ends a PTT application program. When the PTT group call is terminated among the remaining members, the PTT portable terminal receives from the PTT server a notification message indicating that the PTT group call has been recorded and plays the recorded PTT group call.

According to another exemplary aspect of the present invention, a PTT service is provided through a PTT server in a PTT portable terminal where if, the PTT portable terminal requests termination of a PTT group call during the PTT group call taking place between at least three members, requests a recording of the PTT group call and ends a PTT application program. Upon connection to the PTT service, the portable terminal determines whether the PTT group call has ended among the remaining members and, if the PTT group call has ended, the recorded PTT group call is played back upon a request for play back of the call. If the PTT group call is still active, the PTT portable terminal joins the PTT group call.

According to a further exemplary aspect of the present invention, a PTT service is provided for a PTT group call among PTT portable terminals in a PTT server where the PTT server services the PTT group call taking place between at least three members. The PTT group call is recorded from a time when a member ends the PTT group call until a time when the PTT group call ends among the remaining members. If a PTT portable terminal of the member is connected to the PTT service, the PTT server plays the recorded PTT group call to the member.

According to still another exemplary aspect of the present invention, a PTT service is provided for a PTT group call among PTT portable terminals in a PTT server where the PTT server services the PTT group call taking place between at least three members, records the PTT group call from a time when a member ends the PTT group call, and asks the member whether to join the PTT group call if a PTT portable terminal of the member is connected to the PTT service. At a member's request, the PTT server joins the member in the PTT group call. At a member's request, the PTT server completes recording of the PTT group call when the PTT group call ends among the remaining member. The PTT server then transmits a notification message to the member, indicating that the PTT group call has been recorded, and plays the recorded PTT group call to the member.

According to yet another exemplary aspect of the present invention, a PTT service is provided for a PTT group call among PTT portable terminals of at least three members through a PTT server, the PTT server services the PTT group call to the PTT portable terminals, and records the PTT group call in the PTT server if a PTT portable terminal requests termination of the PTT portable terminal participation in the PTT group call. If the PTT group call ends among the remaining members, the PTT server completes recording of the PTT group call and transmits a notification message to the PTT portable terminal, indicating the completion of recording of the PTT group call. The portable terminal then receives the recorded PTT group call from the PTT server.

According to yet a further exemplary aspect of the present invention, a PTT service is provided for a PTT group call among PTT portable terminals of at least three members through a PTT server, the PTT server services the PTT group call to the PTT portable terminals and records the PTT group call if a PTT portable terminal requests termination of the PTT portable terminal participation in the PTT group call to the PTT server during the PTT group call. The PTT server determines whether the PTT portable has been connected to the PTT service. If the PTT portable has been connected to the PTT service, the PTT server determines whether the PTT group call has ended among the remaining members. If the PTT group call has ended, the PTT server transmits to the PTT portable terminal a notification message indicating that the PTT group call has been recorded, and services the recorded PTT group call to the PTT portable terminal upon request for play back of the call. If the PTT group call is still active and the member wants to join the PTT group call, the PTT portable terminal joins the PTT group call.

BRIEF DESCRIPTION OF THE DRAWINGS

The above and other exemplary objects, features and advantages of the present invention will become more apparent from the following detailed description of exemplary embodiments of the present invention when taken in conjunction with the accompanying drawings in which like reference symbols indicate the same or similar components, wherein.

DETAILED DESCRIPTION OF EXEMPLARY EMBODIMENTS

Exemplary embodiments of the present invention will be described herein below with reference to the accompanying drawings. In the following description, well-known functions or constructions are not described for conciseness.

In accordance with exemplary embodiments of the present invention, if a member ends or drops either intentionally or nonintentionally a Push To Talk (PTT) group call made among at least three members during the PTT group call in progress, a PTT server records the PTT group call from the termination time point and plays the recording to the member.

The PTT group call is made in the following initial PTT call procedure.

Figure 1:
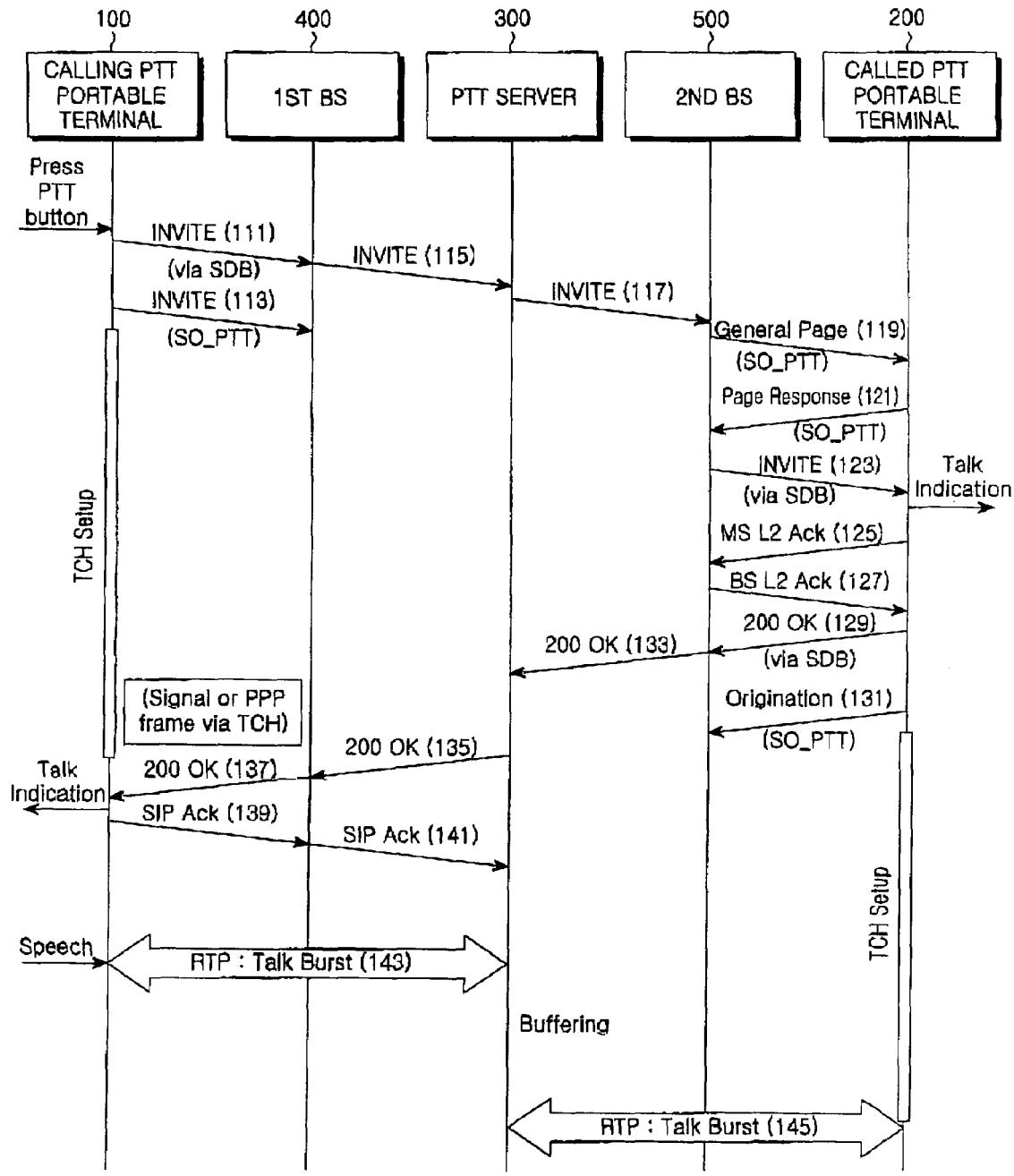
FIG. 1 is a diagram illustrating a signal flow in an early session procedure for a Push To Talk (PTT) call.

FIG. 1 is a diagram illustrating a signal flow in a typical early session procedure for a PTT call.

Referring to FIG. 1, a calling PTT portable terminal 100 and a called PTT portable terminal 200 negotiate with first and second Base Stations (BSs) 400 and 500, respectively, thereby setting up traffic channels, and establish voice communication using a Session Initiation Protocol (SIP)-based PTT application program.

In step 111, the calling PTT portable terminal 100 transmits an Invite message in the form of a Short Data Burst (SDB) message to the first BS 400 in order to request a PTT call in step 111. In step 113, the calling PTT portable terminal 100 sets up a traffic channel (TCH), while making service option ($SO_{13}PTT$) negotiations with the first BS 400. The negotiations are the process of preparing for higher-layer network sessions from a physical layer to an application layer, including a Point-to-Point Protocol (PPP) session, and they are called "Origination".

In steps 115 and 117, the first BS 400 forwards the Invite message to a PTT server 300 and the second BS 500 which services the called PTT portable terminal 200, respectively. The second BS 500 transmits a General Page signal to the called PTT portable terminal 200 in step 119 and the called PTT portable terminal 200 transmits a Page Response signal to the second BS 500 in step 121. During the paging, the second BS 500 transmits the Invite message in the form of a SDB message to the called PTT portable terminal 200 in step 123. Then, the called PTT portable terminal 200 provides a PTT alert to the called party such as an audible ring, beep or chirp, indicating that someone wants to speak with the called party. However, because a TCH is not yet established for the called PTT portable terminal 200, no utterance or ring back tone is transmitted to the calling PTT portable terminal 100.

In step 125, the called PTT portable terminal 200 transmits an MS L2 Ack signal to the second BS 500, indicating that the Invite signal has been correctly received. In step 127, the second BS 500 transmits to the called PTT portable terminal 200 a BS L2 Ack signal indicating correct reception of the MS L2 Ack signal.

The called PTT portable terminal 200 transmits a 200 OK message in the form of an SDB to the second BS in step 129. The 200 OK message indicates that the called PTT portable terminal 200 accepts the PTT call request.

In step 131, the called PTT portable terminal 200 also makes SO_PTT negotiations with the second BS 500 and sets up a TCH.

In steps 133, 135 and 137, the 200 OK message is forwarded to the calling PTT portable terminal 100 through the second BS 500, the PTT server 300, and the first BS 400, respectively. The calling PTT portable terminal 100 now completes the TCH setup, and gives a PTT alert to the caller, indicating that the called PTT portable terminal 200 has accepted the PTT call.

In steps 139 and 141, the calling PTT portable terminal 100 requests the floor to speak to the PTT server 300 by using a SIP Request message in a session connected state. The PTT server grants the floor to the calling PTT portable terminal 100 through a floor control.

After the floor is made available, the calling PTT portable terminal 100 transmits a talk burst in real time to the PTT server 300 using the Real Time Protocol (RTP) in step 143. The PTT server 300 primarily buffers the talk bursts. After the called PTT portable terminal 200 has completed the TCH setup, the PTT server 300 transmits the buffered talk bursts to the called PTT portable terminal 200 in step 145.

The calling PTT portable terminal 100 and the called PTT portable terminal 200 are now capable of gaining the floor to speak without the need for negotiating with the PTT server 300, using the SPI Ack signal and an Ack signal for the SIP Request signal.

The above-described one-to-many communication service is defined as a PTT group call in the PTT service. The following describes a signal process in the case where a participant ends its participation in a PTT group call during a call.

Figure 2:
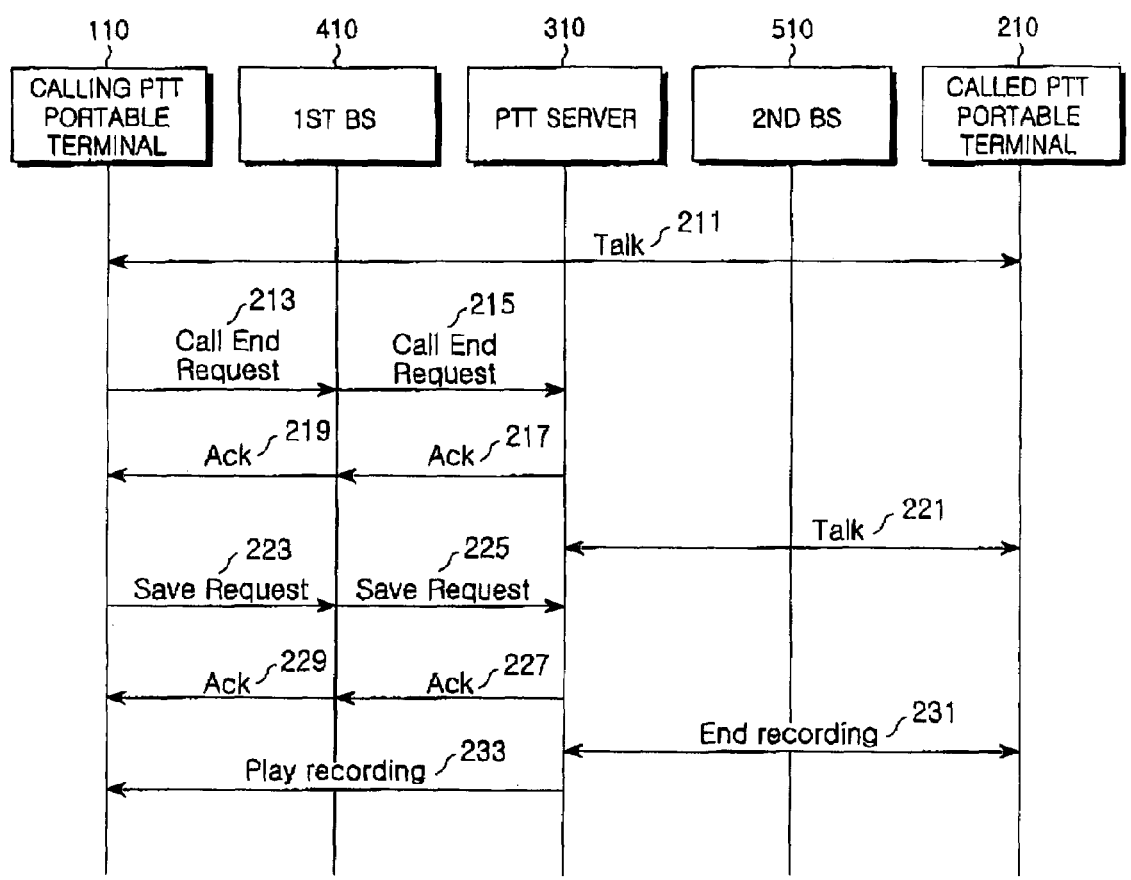
FIG. 2 is a diagram illustrating a signal flow in a PTT group call according an exemplary embodiment of the present invention.

FIG. 2 is a diagram illustrating a signal flow in a PTT group call according to an exemplary embodiment of the present invention. In the illustrated case, first and second PTT portable terminals can be the calling and called PTT portable terminals illustrated in FIG. 1. While only the two PTT portable terminals are shown in FIG. 2, it is to be understood that third to $N^{th}$ PTT portable terminals are also involved in the PTT group call. The following description is made under the assumption that the first PTT portable terminal ends its participation in the PTT group call during a call.

Referring to FIG. 2, a PTT group call has been made in the early session procedure illustrated in FIG. 1 and group members participate in the PTT group call in step 211 (Talk). If the user of a first PTT portable terminal 111 is not available for the PTT group call any longer and requests termination of its participation in the PTT group call, the first PTT portable terminal 110 transmits a Call End Request message to a first BS 410 in step 213. In step 215, the first BS 410 transmits the Call End Request message to a PTT server 310. In steps 217 and 219, the PTT server 310 transmits an Ack signal for the Call End Request message to the first BS 410 and the first BS 410 in turn transmits the Ack signal to the first PTT portable terminal 110. In the mean time, the PTT group call is active among the other members including the user of a second PTT portable terminal 210 and the users of the third to $N^{th}$ PTT portable terminals in step 221.

In steps 223 and 225, the first PTT portable terminal 110 transmits a Save Request message to the first BS 410 and the first BS 410 in turn transmits the Save Request message to the PTT server 310. The PTT server 310 then transmits an Ack signal for the Save Request message to the first BS 410 and records the PTT group call from the time of transmitting the Ack signal in step 227.

In step 229, the first BS 410 transmits the Ack signal to the first PTT portable terminal 110. A message indicating that the PTT group call will be recorded is displayed on the display window of the first PTT portable terminal 110. The PTT server 310 later services the PTT group call recording to the user of the first PTT portable terminal 110. The operations of the first PTT portable terminal 110 and the PTT server 310 will be described later.

In step 231, the PTT server 310 ends recording of the PTT group call when the PTT group call ends.

Upon request from the first PTT portable terminal 110, the PTT group call recording is played in step 233. A detailed description will be made of servicing the PTT group call recording by the PTT server 310 and receiving the recorded PTT group call by the first PTT portable terminal 110.

Figure 3:
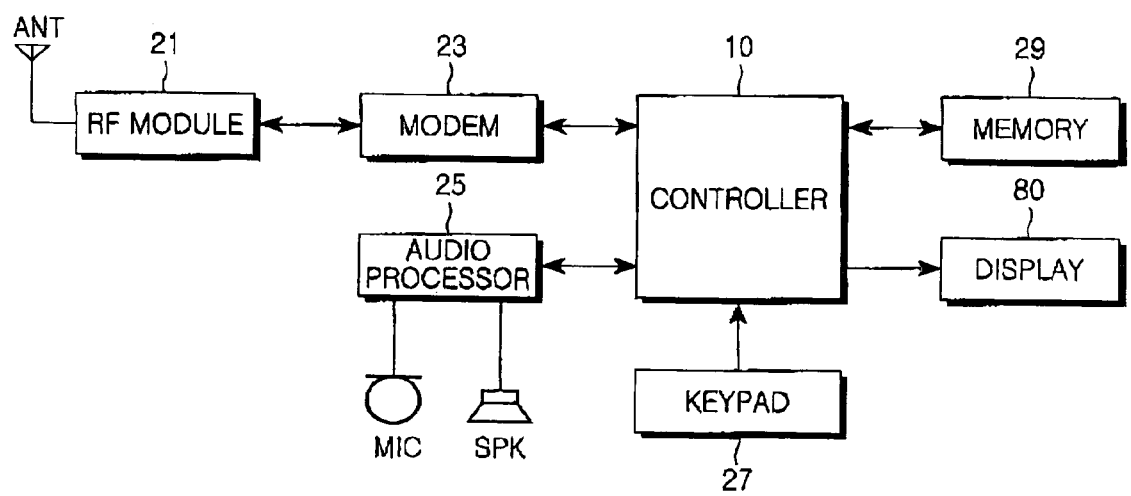
FIG. 3 is a block diagram of a PTT portable terminal according to an exemplary embodiment of the present invention.

FIG. 3 is a block diagram of a PTT portable terminal according to an exemplary embodiment of the present invention. The portable terminal can be a PTT mobile phone. It also can be the first PTT portable terminal that operates in the manner depicted in FIG. 2.

Referring to FIG. 3, a radio frequency (RF) module 21 takes charge of communications for the PTT portable terminal. The RF module 21 comprises a radio frequency (RF) transmitter (not shown) for upconverting the frequency of a transmission signal and amplifying the upconverted signal, and a RF receiver (not shown) for low-noise amplifying a received signal and downconverting the frequency of the amplified received signal.

A MODEM 23 is provided with a transmitter (not shown) for encoding and modulating the transmission signal and a receiver (not shown) for demodulating and decoding the received signal. The MODEM 23 processes packet data or audio signals such as voice.

An audio processor 25 receives an audio signal processed by the MODEM 23 from a controller 10, converts the audio signal to audible sound, and outputs the audible sound through a speaker (SPK). The audio processor 25 also converts an audio signal received from a microphone (MIC) to audio data and transmits the audio data to the controller 10. When the user makes a PTT call, the audio processor 25 converts a voice signal through the microphone to audio data and provides the audio data to the controller 10. When the user receives a PTT call, the audio processor 25 processes audio data corresponding to a PTT alert sound and outputs the PTT alert sound through the speaker under the control of the controller 10. In addition, the audio processor 25 outputs the conversation of a PTT group call through the speaker.

A keypad 27 is provided with alphanumerical keys and function keys for invoking functions. It can also comprise function keys associated with a PTT group call. For example, the keypad 27 has a PTT key by which to speak in a PTT group call, a PTT group call recording key by which to request call recording, a PTT group call play key by which to request call playing or play back, and a play control key by which to forward or rewind the call recording during play back.

A memory 29 has a program memory and a data memory. The program memory stores programs needed to control the conventional operation of the PTT portable terminal and PTT application programs to perform a PTT call. It also stores a program by which to connect to a PTT server and play and output a PTT group call recording through the speaker. The data memory temporarily stores data generated during the execution of the programs. The data memory stores information about settings by the PTT application program. The data memory also stores a Short Messaging Service (SMS) or Instant Message (IM) message indicating completion of PTT group call recording.

The controller 10 provides overall control of the PTT portable terminal. The controller 10 can incorporate the MODEM 23 therein. In termination of a PTT call, the controller 10 outputs to the audio processor 25 audio data corresponding to a PTT alert sound indicating the incoming PTT call. Upon request of ending a PTT group call while the other parties are still connected, the controller 10 controls a display 80 to display a corresponding message. The controller 10 receives a PTT group call recording from the PTT server through the RF module 21 and the MODEM 23 and controls the PTT call recording to be played through the speaker. The controller 10 controls the play position of the PTT group call recording in the PTT server to be adjusted by means of a play control key. The PTT server should be able to control the play position of the PTT group call recording in response to a signal generated by the play control key. When the user ends the PTT group call while the other parties are still connected and runs the PTT application program during the on-going or active PTT group call, the controller 10 displays a message indicating that the PTT group call is still on-going on the display 80. Upon request of participation from the user, the controller 10 controls a reconnection to the PTT group call.

The display 80 displays messages generated during the execution of programs under the control of the controller 10 and displays user data received from the controller 10. The user data refers to icons representing, for example, the remaining capacity of a battery, received sensitivity, and morning call setting or non-setting, and current time. The display 80 displays information about group members participating in a PTT group call. When some member gains the floor in the PTT group call, the display 80 indicates that the floor is open to the member by displaying the member information. If the user wants to end the PTT group call while the other parties are still connected, the display 80 displays a message asking whether to record the on-going PTT group call taking place among the other members. Depending on whether the user decides to record the PTT group call, the display 80 displays a message indicating that the PTT group call will be recorded or a message indicating that the user's participation in the PTT group call will end. Upon selection of call recording, the display 80 displays a message indicating completion of the PTT group call recording when the PTT group call ends among the other members. When the user ends the user's participation in the PTT group call while the other parties are still connected and runs the PTT application program during the PTT group call in progress, the display 80 displays a message indicating that the PTT group call is not yet ended. This notification message can be displayed on a pop-up window, for example. A liquid crystal display (LCD) can be used for the display 80. In an exemplary implementation of an exemplary embodiment of the present invention, the display 80 is provided with a LCD controller, a memory for storing video data, and an LCD device. If the LCD is implemented as a touch screen, the keypad 27 and the LCD can function as an input portion.

In operation, when the user dials through the keypad 27 and sets an origination mode, the controller 10 processes dialed information received through the MODEM 23, converts the dialed information to a RF signal through the RF module 21, and transmits the RF signal. If the other party responds, the RF module 21 and the MODEM 23 detect the response and a voice path is established through the audio processor. Thus, the user can talk. In a termination mode, the controller 10 detects the termination mode through the MODEM 23 and generates a ring signal through the audio processor. If the user responds, the controller 10 detects the response and a voice path is established through the audio processor 25, for communications. While the origination and termination modes are described in the context of voice communications, the exemplary implementations of the present invention can be applied to data communications including packet data and video data without departing from the scope of the present invention. In an idle state or in the case of text communication, the controller 10 displays a text message processed by the MODEM 23 on the display 80. Voice communications in a PTT group call based on the PTT application program and packet data communications in a Push-To-Data (PTD) call are also enabled according to an exemplary embodiment of the present invention.

A description will now be made of an exemplary implementation of the operation of recording a PTT group call and allowing a user to participate in an on-going PTT group call after dropping out of the PTT group call according to an exemplary embodiment of the present invention in the PTT portable terminal having the above-described exemplary configuration while the other parties are still connected.

The controller 10 receives voice from a PTT group through the RF module 21 and the MODEM 23 by the PTT application program and outputs the voice through the microphone after data processing in the audio processor 25. If the floor is granted to the user, the controller 10 converts a voice signal received from the speaker to audio data through the audio processor 25 and transmits the audio data to the PTT server through the MODEM 23 and the RF module 21. At the same time, the display 80 displays an indication for indicating a member having the floor by his member information. Data generated during the PTT group call is temporarily stored in the memory 29.

Upon input of a PTT group call end key through the keypad 27 during the PTT group call, the controller 10 ends participation of the user in the PTT group call and displays a message indicating that recording of the PTT group call will start on the display 80.

If the other group members end the PTT group call, the controller 10 receives an IM message indicating the termination of the PTT group call from the PTT server and displays it on the display 80. The controller 10 then plays the PTT group call recording through the speaker. However, if the user runs the PTT application program before the PTT group call ends, the controller 10 displays a message indicating that the PTT group call is still in progress and a message asking whether the user wishes to join the call on the display 80. Upon request from the user, the controller 10 resumes the user's participation in the PTT group call.

An exemplary implementation of the operations of the PTT portable terminal and the PTT server according to exemplary embodiments of the present invention in a PTT group call as described with reference to FIGS. 1, 2 and 3 will now be detailed below.

Figure 4A:
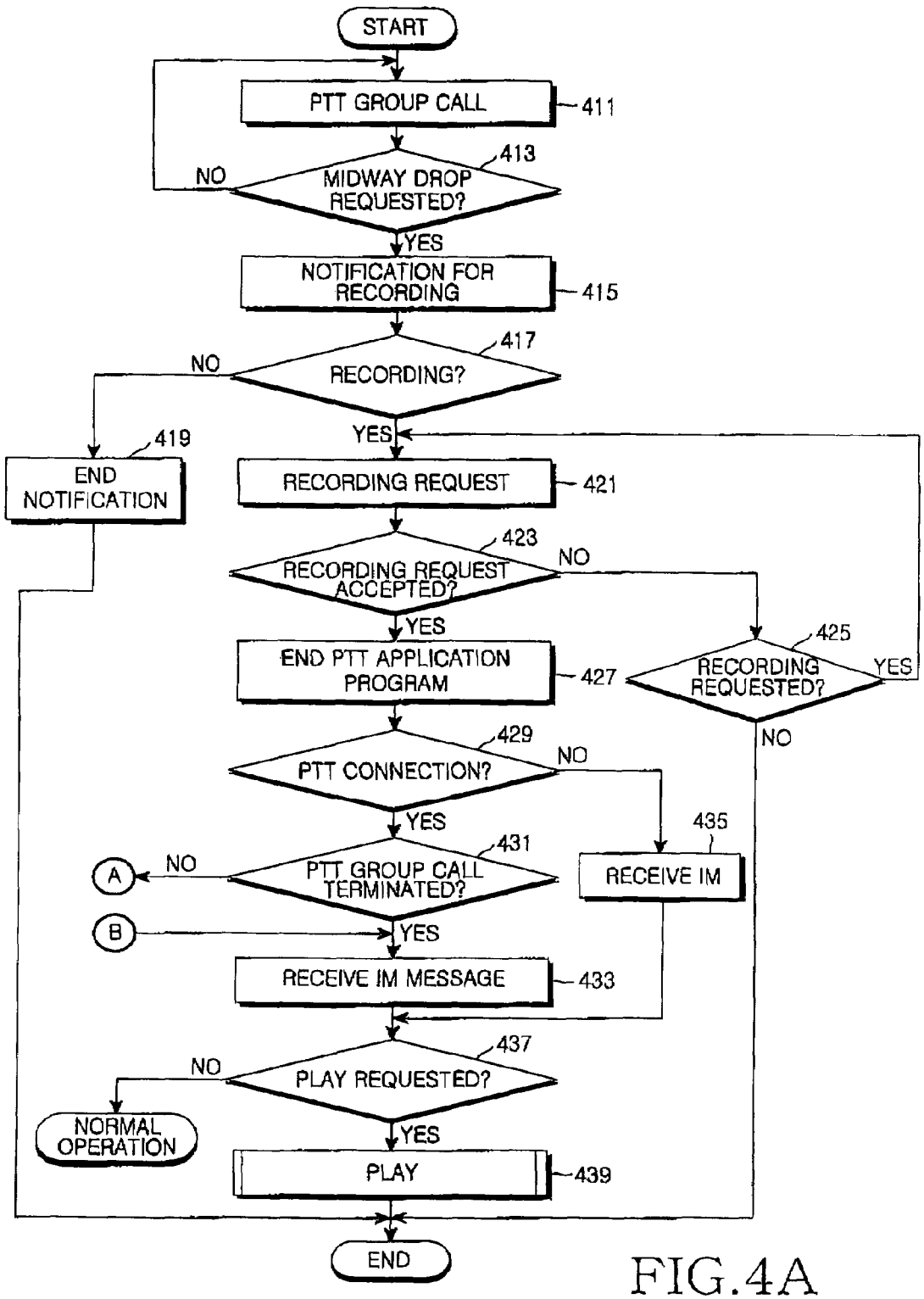
FIGS. 4A and 4B are flowcharts illustrating an exemplary implementation of a PTT service method in the PTT portable terminal in the procedure according to an exemplary embodiment of the present invention illustrated in FIG. 2.
Figure 4B:
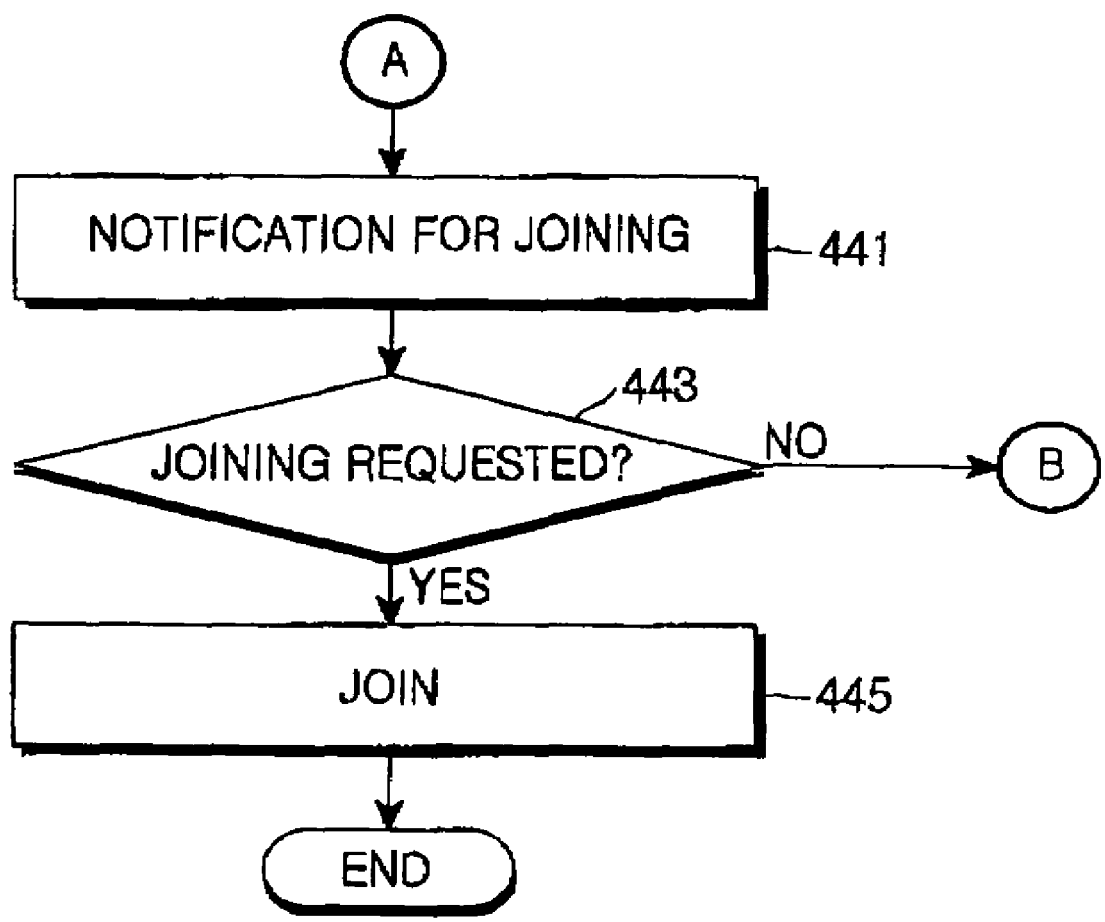

FIGS. 4A and 4B are flowcharts illustrating an exemplary implementation of a PTT service method according to exemplary embodiments of the present invention in the PTT portable terminal in the exemplary operation illustrated in FIG. 2. This operation of the PTT portable terminal is enabled by the signal procedure for a PTT call described with reference to FIGS. 1 and 2 which will not be described again.

Referring to FIGS. 4A and 4B, the controller 10 makes a PTT group call to desired members selected by the keypad 27 in step 411. As described earlier with reference to FIG. 1, a user requests the floor by a SIP Ack signal, gains the floor under the control of the PTT server, and then speaks in a PTT group call.

In step 413, the controller 10 determines whether the user's participation in the PTT group call has been terminated midway such as while the other parties are still connected. If the PTT group call still goes on, the controller 10 continues the PTT group call among the group members in step 411 until it is terminated.

Upon a user dropping out of the PTT group call, the controller 10 displays a message asking whether to record the PTT group call on the display 80 in step 415. The message can be "Will you record the PTT group call?" and "Yes" or "No" are given as choices. The choices can be selected by shifting the cursor using an OK key.

In step 417, the controller 10 determines whether the PTT group call is to be recorded. Depending on the determination result, the controller 10 proceeds to step 419 or step 421. In the case of a negative choice, the controller 10 displays a message indicating that the user's participation in the PTT group call has been terminated on the display 80 in step 419.

In the case of a positive choice, the controller 10 transmits a call recording request to a BS in step 421. The BS then transmits the call recording request to the PTT server. The PTT server transmits a response signal for the call recording request to the PTT portable terminal through the BS. The response signal can be an Ack or Nack.

In step 423, the controller 10 determines whether the response signal is an Ack or Nack. In the case of a Nack, the controller 10 requests whether to record the PTT group call in step 425. If the user wants to record the PTT group call, the controller 10 returns to step 421 and retransmits the call recording request. On the other hand, if the user does not want to record the PTT group call, the controller 10 terminates the PTT group call for the user.

If the response signal is an Ack, the controller 10 displays a message indicating that the recording will begin on the display, ends the PTT application program, and enters into an idle mode in step 427.

In step 429, the controller 10 determines whether the PTT application program has been invoked for connection to the PTT service. The controller 10 asks the PTT server whether the PTT group is still in progress in step 431. The response of the PTT server is received through the BS.

If the PTT service has not been connected in step 429, the controller 10 receives from the PTT server an IM message indicating completion of the call recording made after the midway dropping and displays the IM message on the display 80 in step 435 and proceeds to step 437.

If the PTT group call has been terminated in step 431, the controller 10 displays a message indicating the call recording has been completed on the display 80 in step 433. In step 437, the controller 10 determines whether the user has requested the playing or play back of the PTT group call. If the user has requested the playing or playing back of the PTT group call, the controller 10 plays the PTT group call recording in step 439. For example, upon input of the PTT group call play key in the keypad 27, the controller 10 attempts to connect to a voice mail (voice service) or to the Uniform Resource Locator (URL) having the PTT group call recording, and downloads it from the PTT server.

An exemplary implementation of the operation of playing the PTT call recording according to an exemplary embodiment of the present invention will be described with reference to FIG. 5.

Figure 5:
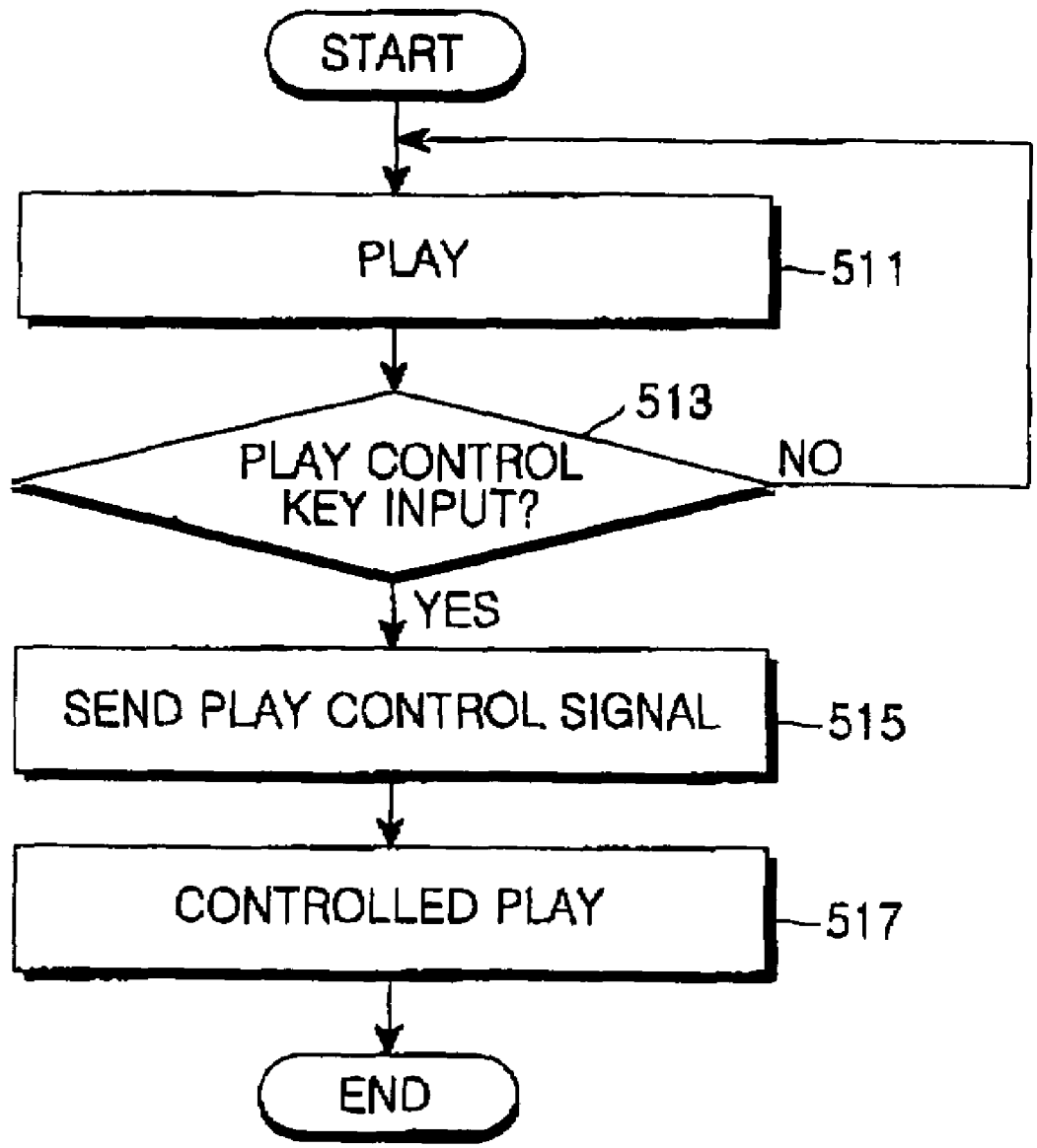
FIG. 5 is a flowchart illustrating an exemplary implementation of a PTT group call playing operation in the procedure according to an exemplary embodiment of the present invention illustrated in FIG. 4A.

Referring to FIG. 5, the controller 10 plays the PTT group call recording in step 511 and determines whether the play control key has been input in step 513. Upon input of the play control key, the controller 10 transmits to the PTT server a play control signal corresponding to the manipulation of the play control key used to control the play position and play speed of the PTT group call recording in step 515. The controller 10 then downloads the PTT group call recording according to the controlled play position and play speed from the PTT server and correspondingly plays the PTT group call recording through the speaker in step 517. The PTT portable terminal should be able to change the play position and play speed of the PTT group call recording in the PTT server in accordance with the input of the play control key. For example, the play control key can have two unique frequencies (low frequency and high frequency) called Dual Tone Multi Frequency (DTMF). If '1' is pressed, a low frequency of 697 Hz is mixed with a high frequency of 1209 Hz into a signal of "1" and transmitted to the PTT server. The PTT server then controls the play position of the PTT group call recording according to the DTMF and services the controlled PTT group call recording to the PTT portable terminal.

According to an exemplary embodiment of the present invention, in the absence of the input of the play control key, the controller 10 plays the PTT group call recording through the speaker sequentially at a constant speed in step 511 before the input of the play control key.

Returning to FIGS. 4A and 4B, if the PTT group call is still active among the other group members in step 431, the controller 10 displays a message asking whether the user will join the PTT group call on the display 80 in step 441. If the users wants to join in step 443, the controller 10 joins the user in the PTT group call in step 445.

If the user does not want to join in, the controller 110 returns to step 433 and repeats steps 437 and 439. The call playing operation is enabled with the aid of the PTT server.

Figure 6:
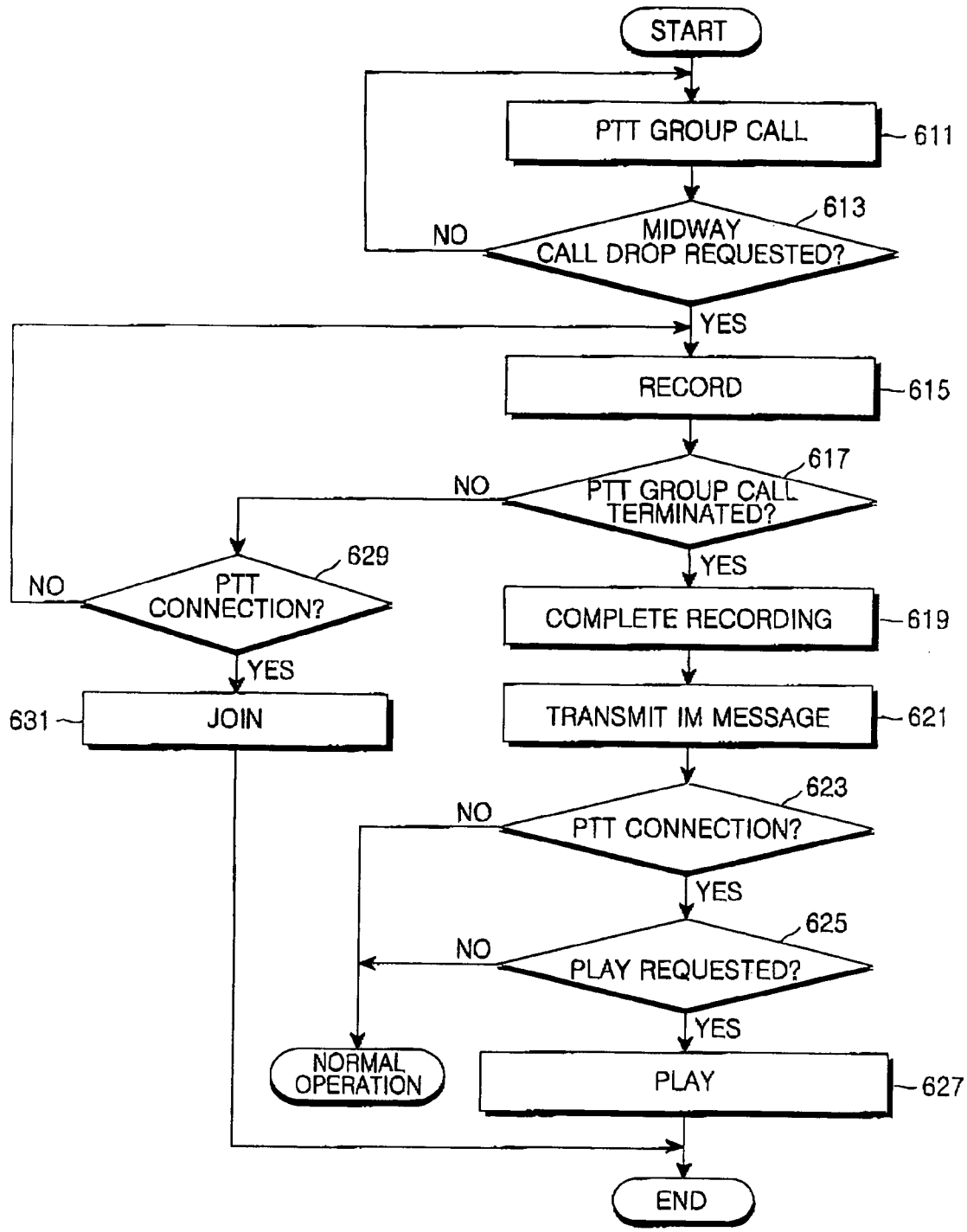
FIG. 6 is a flowchart illustrating an exemplary implementation of a PTT service method in a PTT server in the procedure according to an exemplary embodiment of the present invention illustrated in FIG. 2.

FIG. 6 is a flowchart illustrating an exemplary implementation of a PTT service method according to an exemplary embodiment of the present invention in a PTT server in the procedure illustrated in FIG. 2.

Referring to FIG. 6, the PTT server provides the PTT group call among the group members in step 611 and determines whether there is a member requesting ending of the member's participation in the PTT group call during the call in step 613. In the presence of such a member, the PTT server starts to record the PTT group call in step 615. At the same time, the PTT server stores information about the requesting PTT portable terminal. To record the PTT group call, the PTT server must receive a call recording request from the PTT portable terminal.

In step 617, the PTT server determines whether the PTT group call has been completely terminated among the remaining group members. Upon termination of the PTT group call, the PTT server ends the recording of the PTT group call in step 619. In step 621, the PTT server reads the stored information about the PTT portable terminal and transmits an IM message indicating the termination of the PTT group call to the PTT portable terminal. The notification can be made by a PTD service instead of the IM message. In the PTD service, the PTT group call recording is transmitted along with the notification message.

According to an exemplary embodiment of the present invention, , the user of the PTT portable terminal is informed by the IM notification message that the PTT group call has been terminated and recorded.

In step 623, the PTT server determines whether the PTT portable terminal has been connected to the PTT service. If it has, the PTT server determines whether a call play request has been received from the PTT portable terminal in step 625. Upon receipt of the call play request, the PTT server plays the PTT call recording to the PTT portable terminal through a voice mail or a URL in step 627. To identify the PTT portable terminal that dropped midway out of the PTT group call in steps 621 and 623, the PTT portable terminal information stored together with the PTT group call in step 615 is used. If information about the PTT portable terminal connected to the PTT service is identical to the stored PTT portable terminal information, the PTT server transmits the IM message to the PTT portable terminal to provide the PTT service.

Meanwhile, if the PTT group call is still active for the remaining group members, the PTT server determines whether the PTT portable terminal has been connected to the PTT group call in step 629. If it has, the PTT server joins the user in the PTT group call upon request from the user in step 631.

In accordance with an exemplary embodiment of the present invention as described above, when a group member drops out of a PTT group call in progress, the group call starts to be recorded during the member's absence, so that the member can play the call later. Since a play position and a play speed can be controlled in playing the PTT group call recording, the group member can conveniently determine what was discussed in the PTT group call while the member was away. Also, notification messages indicating the recording of the PTT group call and the termination of the PTT group call are displayed for the group member. If the group member reconnects to a PTT service during the PTT group call in progress after the dropping out of the PTT group call, the member is notified that the PTT group call is still active, so that the group member can rejoin the PTT group call immediately.

While exemplary implementations according to the present invention have been shown and described with reference to exemplary embodiments thereof, it will be understood by those skilled in the art that various changes in form and details may be made without departing from the spirit and scope of the invention as defined by the appended claims.

What is claimed is:

1. A method of providing a Push-To-Talk (PTT) service through a PTT server in a PTT portable terminal, the method comprising the steps of:
   requesting termination by a first member of at least three members in PTT group call of a participation of the PTT group call during the PTT group call among the at least three members;
   requesting by the first member recording of the PTT group call to the PTT server and ending a PTT application program of the first member;
   recording the PTT group call by the PTT server; and
   receiving a notification message by the first member indicating that the PTT group call has been recorded.

2. The method of claim 1, wherein the notification message is received by the first member, when the PTT group call is terminated among the remaining members.

3. The method of claim 1, further comprising:
   playing the recorded PTT group call by the first member.

4. The method of claim 1, further comprising the step of asking the first member whether to record the PTT group call when an acknowledgement signal is not received for the request of call recording.

5. The method of claim 1, further comprising the step of displaying the notification message by the first member.

6. The method of claim 1, further comprising the step of, if recording of the PTT group call is not requested by the first member, displaying a notification message by the first member indicating termination of the PTT group call and ending the PTT application program.

7. The method of claim 1, wherein the playing step comprises the steps of:
   determining by the first member whether a key input requesting a play control for the recorded PTT group call has been generated during playing; and
   playing the recorded PTT group call by the first member according to the key input upon generation of the key input requesting a play control.

8. The method of claim 7, wherein the key input comprises a Dual Tone Multi Frequency (DTMF) signal to the PTT server and the PTT server performs the play control according to the DTMF signal.

9. The method of claim 7, wherein the play control comprises control of at least one of a play position and play a speed.

10. A method of providing a Push-To-Talk (PTT) service through a PTT server in a PTT portable terminal, the method comprising the steps of:
    requesting termination of participation of a PTT group call by a first member of at least three members in the PTT group call during the PTT group call among the at least three members;
    requesting recording of the PTT group call by the first member to the PTT server and ending a PTT application program of the first member;
    recording the PTT group call by the PTT server; and
    determining by the PTT server, upon connection to the PTT service, whether the PTT group call has ended among the remaining members.

11. The method of claim 10, wherein the step of determining further comprises:
    if the PTT group call has ended, playing the recorded PTT group call by the first member upon request for play back of the call.

12. The method of claim 11, wherein the playing step comprises the step of, if the joining is not requested by the first member, playing the recorded PTT group call by the first member upon the request for the call play back, when the PTT group call ends among the remaining members.

13. The method of claim 11, wherein the playing step comprises the steps of:
    displaying a notification message by the first member indicating, that the recording has been completed, if the PTT group call ends among the remaining members upon connecting the first member to the PTT service; and
    connecting the first member to the recorded PTT group call, upon request for call play back by the first member and playing the recorded PTT group call.

14. The method of claim 11, wherein at least one of the connecting and play back step comprises, upon the first member requesting call play back, at least one of connecting to a voice mail and a Uniform Resource Locator (URL) having the recorded PTT group call and downloading the recorded PTT group call.

15. The method of claim 10, further comprising:
    joining the first member to the PTT group call if the PTT group call is still active.

16. The method of claim 15, wherein the joining step comprises the steps of:

displaying a notification message by the first member indicating that the PTT group call is still active;
determining by the first member whether the joining is requested; and
joining the first member to the PTT group call if the joining is represented.

17. The method of claim 10, further comprising the step of, if the PTT portable terminal of the first member is not connected to the PTT service after the termination of the participation in the PTT group call, displaying a notification message by the first member indicating completion of the recording of the PTT group call, when the PTT group call ends among the remaining members.

18. A method of providing a Push-To-Talk (PTT) service for a PTT group call among PTT portable terminals through a PTT server, the method comprising the steps of:
servicing the PTT group call among at least three members;
recording the PTT group call from a time when a first member of the at least three members ends participation of the first member in the PTT group call; and
playing the recorded PTT group call to the first member if a PTT portable terminal of the first member is connected to the PTT service.

19. The method of claim 18, wherein the step of recording is performed until a time when the PTT group call ends among the remaining members.

20. The method of claim 18, wherein the playing step comprises the step of transmitting a notification message to the PTT portable terminal of the first member, the notification message comprising indication that the PTT group call has been recorded, when the PTT portable terminal of the first member is connected to the PTT service.

21. The method of claim 18, further comprising the step of controlling the playing of the recorded PTT group call upon request for play control from the PTT portable terminal of the first member.

22. The method of claim 21, wherein the controlling of the playing step comprises the step of controlling playing of the recorded PTT group call according to a Dual Tone Multi Frequency (DTMF) signal received from the PTT portable terminal of the first member.

23. The method of claim 18, wherein the playing step comprises the step of downloading the recorded PTT group call to the PTT portable terminal of the first member when the PTT portable terminal of the first member connects to a voice mail or a Uniform Resource Locator (URL) having the recorded PTT group call.

24. The method of claim 18, wherein the recording step further comprises storing first information about the PTT portable terminal of the first member with the recording of the PTT group call.

25. The method of claim 24, wherein the playing step comprises the step of comparing the first information about the PTT portable terminal of the first member stored with the recording of the PTT group call with a second information about PTT portable terminal connecting to the PTT service, and playing the recording of the PTT group call if the second and first information match.

26. A method of providing a Push-To-Talk (PTT) service for a PTT group call among PTT portable terminals through a PTT server, the method comprising the steps of:
servicing the PTT group call among at least three members;
recording the PTT group call from a time when a first member of the at least three members ends participation of the first member in the PTT group call; and
requesting the first member to join the PTT group call, if a PTT portable terminal of the first member is connected to the PTT service, and joining the first member in the PTT group call if the first member complies;
completing recording of the PTT group call when the PTT group call ends among the remaining first member; and
if the first member complies with the request to join the PTT group call, transmitting a notification message to the first member, the notification message comprising indication that the PTT group call has been recorded, and playing the recorded PTT group call to the first member.

27. A method of providing a Push-To-Talk (PTT) service for a PTT group call among PTT portable terminals of at least three members through a PTT server, the method comprising the steps of:
servicing the PTT group call to the PTT portable terminals through the PTT server;
recording the PTT group call if a PTT portable terminal of the at least three portable terminals requests termination of participation of the PTT portable terminal in the PTT group call;
completing recording of the PTT group call if the PTT group call ends among the remaining members; transmitting a notification message to the PTT portable terminal, the notification message comprising indication of the completed recording of the PTT group call; and
receiving the recorded PTT group.call from the PTT server in the PTT portable terminal.

28. A method of providing a Push-To-Talk (PTT) service for a PTT group call among PTT portable terminals of at least three members through a PTT server, the method comprising the steps of:
servicing the PTT group call to the PTT portable terminals through the PTT server;
recording the PTT group call if a PTT portable terminal of a member of the at least three members requests termination of participation of the PTT portable terminal in the PTT group call during the PTT group call;
determining whether the PTT portable has been connected to the PTT service; determining whether the PTT group call has ended among the remaining members if the PTT portable has been connected to the PTT service;
transmitting to the PTT portable terminal a notification message indicating that the PTT group call has been recorded, if the PTT group call has ended;
servicing the recorded PTT group call to the PTT portable terminal upon request for call play back; and
joining the PTT portable terminal in the PTT group call if the PTT group call is still active and the member requests or complies with a request to join the PTT group call.

29. An apparatus for providing a Push-To-Talk (PTT) service comprising:
an input unit for entering a request;
a display for displaying a connection among users; and
a controller for requesting termination of a participation of a first member of at least three members in PTT group call during the PTT group call among the at least three members, requesting recording of the PTT group call of the first member, and receiving a notification message indicating that the PTT group call has been recorded.

30. The apparatus of claim 29, wherein the PTT server receives the requests.

31. The apparatus of claim 29, wherein the controller ends a PTT application program after the request to record the PTT group call is made.

32. The apparatus of claim 29, wherein the notification message is received when the PTT group call is terminated among the remaining members.

33. The apparatus of claim 29, wherein the controller plays the recorded PTT group call.

34. The apparatus of claim 29, wherein the controller receives the recording from a PTT server for controlling playback of the recorded group call.

35. A system of providing a Push-To-Talk (PTT) service for a PTT group call among PTT portable terminals through a PTT server, comprising:

the PTT portable terminals for establishing the PTT group call among at least three members;

the PTT server for recording the PTT group call from a time when a first member of the at least three members ends participation of the first member in the PTT group call and playing the recorded PTT group call to the first member if a PTT portable terminal of the first member is connected to the PTT service.

* * * * *